United States Patent Office 3,755,492
Patented Aug. 28, 1973

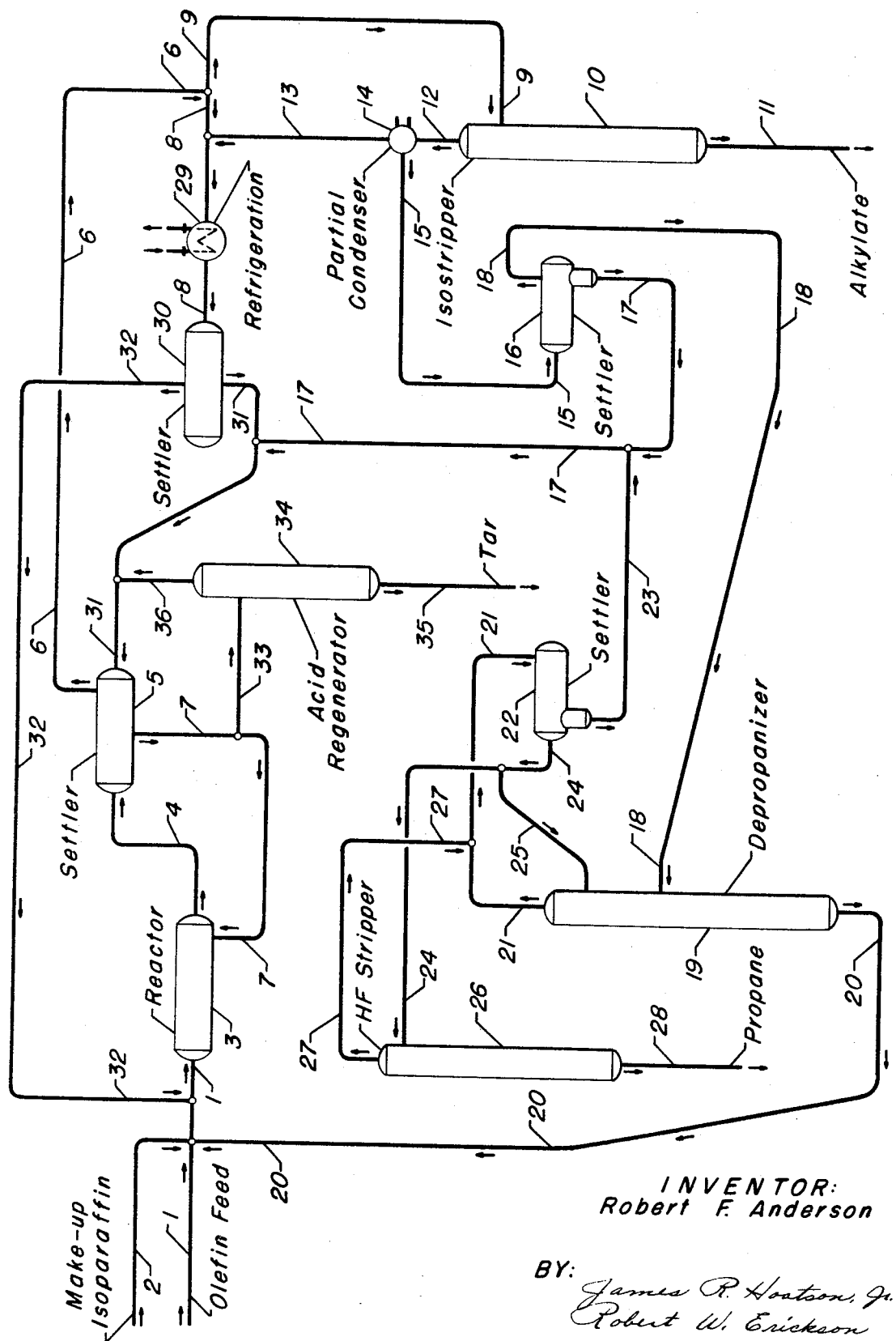

3,755,492
SEPARATE ALKYL FLUORIDE ALKYLATION
WITH A SUBSTANTIALLY PURE HYDRO-
GEN FLUORIDE STREAM
Robert F. Anderson, La Grange Park, Ill., assignor to
Universal Oil Products Company, Des Plaines, Ill.
Filed Mar. 12, 1971, Ser. No. 123,502
Int. Cl. C07c 3/54
U.S. Cl. 260—683.48                                 5 Claims

ABSTRACT OF THE DISCLOSURE

Alkylatable hydrocarbon, i.e. isobutane, isopentane or isohexane, and an olefinic hydrocarbon are reacted in a hydrogen fluoride catalyzed process, the effluent from the reaction zone is commingled with a substantially pure hydrogen fluoride stream to alkylate alkyl fluorides present in said effluent. This substantially pure HF stream is supplied from (1) a catalyst regeneration step, (2) HF separated from the cooled hydrocarbon phase and (3) HF separated from an overhead hydrocarbon fraction.

BACKGROUND

This invention relates to a hydrogen fluoride-catalyzed process for producing an isoparaffin-olefin reaction product. In one aspect, this invention relates to a process for producing an alkylate product having excellent anti-knock properties. In another aspect, this invention relates to refrigeration and separation of reactants and catalyst in an alkylation process. In yet another aspect, this invention relates to defluorination of the effluent from an alkylation reaction zone. In still another aspect, this invention relates to the dilution of an olefinic reactant by an isoparaffinic reactant and subsequent reaction in contact with hydrogen fluoride.

The production of highly branched paraffinic hydrocarbons is of considerable importance to the petroleum refining industry because such products have excellent anti-knock properties and are therefore useful as components in motor fuel. The continuing development of high compression automobile engines, which require fuel having a very high octane rating in order to operate efficiently, has created an ever-increasing demand for such products. These hydrocarbons are typically produced, in commercial processes, by the catalytic alkylation of isobutane with low molecular weight olefins and mixtures of olefins such as propylene, butylenes, and amylenes. Isoparaffins such as isopentane, isohexane, etc., can be alkylated, but are not usually utilized for this purpose because they are, themselves, of value as motor fuel components.

It is well known that alkylation processes may utilize, as catalysts, materials such as sulfuric acid and hydrogen fluoride, in which hydrocarbons are only slightly soluble. Alkylation processes which employ such catalysts are typically effected by admixing an alkylatable reactant, an olefin-acting reactant and the catalyst to form a reaction mixture. The various components of the reaction mixture are intimately contacted and mixed, usually by mechanical means, in an alkylation reaction vessel which is well agitated, or by utilizing other suitable means for causing the relatively insoluble hydrocarbon and catalyst phases to be intimately admixed.

The olefinic reactant employed in these alkylation processes will react not only with the alkylatable reactant, but will also polymerize and will undergo various other undesirable side reactions. For example, polymerization is an undesirable side reaction in processes for catalytically alkylating an isoparaffin reactant, e.g. isobutane, with an olefin-acting agent, e.g. butenes where the alkylate product is to be utilized as a motor fuel component. The undesirable side reactions yield products having low octane ratings and, therefore, little utility as motor fuel components. The low octane side products have less branched molecular structures than the desirable high octane products of alkylation. For example, in the alkylation of isobutane with butylenes, using hydrogen fluoride as a catalyst, the more highly branched trimethylpentanes are the desirable high octane products of the process, while the less branched dimethylhexanes and the heavier $C_9^+$ products, produced by side reactions, are the undesirable low octane products. The higher molecular weight $C_9^+$ products undergo cracking reactions, producing $C_5$–$C_7$ hydrocarbons which also have lower octane rating than the trimethylpentanes. A method for minimizing the formation of these side products in an isoparaffin-olefin alkylation process would result in an improved yield of desirable products and would be an improvement over prior art process.

It has been found in prior art that the undesirable side reaction products can be partially inhibited by adjusting such process variables as the reaction time, catalyst/reactants weight ratio in the reaction mixture of catalyst, reactants and products, area of contact between immiscible phases in the reaction mixture, and the average temperature at which the reaction mixture is held. In some prior art alkylation processes, the reaction mixture has been held at a particular, desired temperature by absorbing heat energy directly from the reaction mixture itself, e.g., utilizing an alkylation reaction vessel which contains bundles of tubes through which cooling water flows. In other process schemes, a portion of the reaction mixture is separated, cooled to a temperature slightly below that of the reaction mixture, and again admixed with the reaction mixture, thus acting as a heat sink. Schemes for maintaining the reaction mixture at a particular temperature have been found necessary because the alkylation reaction is strongly exothermic and because the amount and composition of undesirable side products produced in an alkylation process are temperature dependent, and increase with increasing temperature. Prior art schemes have attempted to produce a high quality alkylate product by maintaining a particular optimum average temperature in the reaction mixture; for instance, maintaining a large excess of catalyst in the reaction mixture, e.g., a catalyst/reactants volume ratio of say 5 to 1 or higher, and utilizing the catalyst as a heat sink to be withdrawn, cooled, and recycled to the reaction mixture. Prior art schemes are based on the supposition that the actual temperature of the reacting species and from it, the alkylation reaction rate, depends on the average bulk temperature of the reaction mixture.

It has been known to withdraw heat from the reactants and/or the catalyst before admixing the reactants with the catalyst to form the alkylation reaction mixture. The object of doing this is the same as that already discussed, i.e., maintaining the bulk average temperature of the reaction mixture at a desired level. For instance, when hydrogen fluoride catalyst has been used as a heat sink, it has been found necessary to cool a stream of catalyst which is withdrawn and reintroduced to the mixture about 10–20° F. below the desired average temperature of the reaction mixture in order to maintain the desired temperature. In so-called effluent refrigeration schemes, for maintaining a desired temperature in a reaction mixture, a part of the iso-paraffinic reactant has been vaporized adiabatically to provide a cooling medium for the alkylation reaction. While these and similar schemes for maintaining a particular temperature in an alkylation reaction mixture, have been at least partially successful in their objective, i.e. control of the average temperature in the alkylation zone, their utility has been found to be quite limited in obtaining an improved alkylate product. It has been found in prior art that the practice of lowering the average temperature of a reaction mixture below a certain level will result neither in a product of superior quality nor in the efficient utilization of the reactants. By maintaining a higher temperature in the catalyst and in the reaction mixture of hydrocarbons and catalyst, a larger fraction of isoparaffin can be held in solution in the catalyst. When the olefinic reactant contacts the catalyst phase, the higher the fraction of isoparaffin in the catalyst, the more selectively the desired alkylate product is produced and the less olefin polymers and other undesirable side products are produced.

In some prior art processes, the necessity of using heat transfer means to cool the alkylation reaction zone dictated that the reaction vessel be constructed in a certain manner to accommodate the heat transfer equipment. Such equipment is not designed in a manner most suitable for the alkylation reaction, in that heat transfer considerations predominated over reaction, mixing and phase separation considerations, resulting in the use of reaction vessels of less than optimum design with respect to these latter considerations. When the temperature of the alkylation process can be regulated and maintained at an optimum level by other means, the reaction vessel may be designed in a manner best suited for the creation of the optimum conditions for mixing, reaction, and phase separation. By maintaining a higher temperature in the catalyst and the reaction mixture of hydrocarbons and catalyst, a larger amount of isoparaffin may be held in solution in the catalyst. When the olefinic reactant contacts the catalyst phase, the greater the concentration of isoparaffin in the catalyst the more selectively the desired, highly branched alkylate is produced, as opposed to the polymeric and less branched products created by self-reaction within the olefinic reactant.

Another method for promoting the selective formation of the highly branched alkylate product is to increase the isoparaffin/olefin ratio in the feed to the process. Economic limitations precluded previous alkylation processes from providing the optimum isoparaffin/olefin ratio, since the recycle rate, required to provide sufficient isoparaffin, necessitated an investment in complicated and expensive equipment, resulting in an uneconomical process. Clearly, a process which would provide a method for maintaining the conditions necessary to produce high quality alkylate and would do so in an economical and relatively uncomplicated manner would be a great improvement over prior art processes.

One of the objections to utilizing recycled hydrocarbons to increase the isoparaffin/olefin reactant ratio in the feed to an alkylation process has been the difficulty of separating an adequate amount of hydrogen fluoride from the hydrocarbons in the recycle stream. When an isoparaffin-rich stream containing entrained hydrogen fluoride is admixed with a stream rich in olefin feed, even a small amount of free acid, i.e., existing as a separate phase, will catalyze the formation of olefinic polymers and less branched alkylate. The isoparaffin/olefin ratio being relatively low in the feed, a correspondingly low quality product is formed. A method for using a recycled hydrocarbon stream to increase the isoparaffin/olefin ratio in the feed to an alkylation process which overcomes the objectionable results created by entrained catalyst would be a distinct benefit.

Another factor which has resulted in an alkylate product of relatively low quality has been the formation of alkyl fluoride in alkylation processes. It is thought that alkyl fluorides are intermediates in the alkylation reaction. They have a tendency to form under the same conditions which favor the selective formation of the desired highly branched products noted above. These conditions include a reaction mixture well diluted with isoparaffin in both the catalyst and the hydrocarbon phases. When these alkyl fluorides fail to react further to form the alkylate product, they are carried over into the fractionation and other purification steps in the alkylation process, and are difficult to separate from the desired product. As purity and quality requirements on motor fuels have increased, the desirability of eliminating these alkyl fluoride contaminants has become increasingly apparent. Previous attempts to provide methods for eliminating these alkyl fluorides have resulted in complicated and uneconomical process schemes.

Heretofore, the alkylate produced in conventional olefin-isoparaffin alkylation processes has been considered an economically satisfactory product although it has consisted of a mixture of desirably high quality alkylate and undesirably low quality alkylate. The present demand for motor fuel of extremely high quality, due in part to an emphasis on unleaded fuels having high octane ratings, has resulted in a relative reduction in the value of an alkylate product which is a mixture of higher and lower quality product. The present demand is for an alkylate product comprising almost exclusively higher quality alkylates, such as trimethylpentanes. Up to now the economics and reaction kinetics of hydrogen fluoride-catalyzed alkylation processes have limited them to the production of alkylate product having undesirably large fractions of less branched hydrocarbon and polymers products with a corresponding lower octane rating in the product than is presently desirable.

SUMMARY OF THE INVENTION

Accordingly, it is an object of this invention to provide an alkylation process to produce alkylate of excellent quality and to insure the most effective utilization of the alkylation process. Another object of this invention is to provide an alkylation process which will result in increased production of a more highly branched hydrocarbon product, and decreased production of a less highly branched or polymerized alkylation product. More particularly, it is an object of this invention to minimize the formation of dimethylhexanes, $C_7^-$ light hydrocarbons and $C_9^+$ heavy hydrocarbons in the alkylation of isobutane with low molecular weight mono-olefins such as propene and butylenes. Another object of this invention is to provide a method for recovering an isoparaffin stream relatively free from hydrogen fluoride and a hydrogen fluoride stream relatively free from hydrocarbons. Another object of this invention is to provide a method for converting alkyl fluorides to a valuable alkylate product. Another object of this invention is to provide a suitable dilution of an olefinic reactant with an isoparaffinic reactant in an alkylation process.

In an embodiment, this invention relates to a process for producing an alkylate product from an alkylatable hydrocarbon reactant and an olefinic hydrocarbon reactant utilizing a hydrogen fluoride catalyst which comprises the steps of: (a) contacting said reactants with said catalyst in an alkylation zone at alkylation conditions; (b) contacting at least a portion of the effluent from said alkylation zone with a defluorination stream in a first separation zone at conditions to provide a first hydrocarbon stream and to recover said catalyst; (c) reducing the temperature of a first portion of said first hydrocarbon stream to a level from about 25° F. to about 150° F. below the temperature in said alkylation zone and recovering said alkylate product from a second portion of said hydrocarbon stream; (d) introducing said cooled first portion of said first hydrocarbon stream into a second separation zone at conditions to provide a second hydrocarbon stream and a catalyst stream; and, (e) introducing said catalyst stream into said first separation zone as said defluorination stream and said second hydrocarbon stream into said alkylation zone.

DESCRIPTION OF THE DRAWING

An understanding of this invention may be aided by reference to the accompanying drawing which represents a schematic flow diagram of an embodiment of the inventive process. The drawing is not intended to limit the process to the embodiment shown, nor is it intended to place a limitation on the scope of this invention. Many variations and modifications of the process within the scope of this invention will be obvious to those skilled in the art from the description herein provided. Olefinic feed enters the process by conduit 1 and is combined with make-up isoparaffin from line 2, recycled refrigerated isoparaffin in line 32, and recycled isoparaffin from line 20. The combined feed is charged to alkylation reactor 3 through line 1 and reacted in contact with hydrogen fluoride catalyst which enters the reactor by conduit 7. The effluent from the reactor is charged to settler 5 via conduit 4 wherein it is contacted with essentially pure hydrogen fluoride which enters by conduit 31. The mixture is therein separated into a hydrocarbon phase and catalyst phase. The hydrocarbon phase is withdrawn via conduit 6, while the catalyst is withdrawn via conduit 7. The hydrocarbon stream in conduit 6 is split into a first portion which enters conduit 8 and a second portion which enters conduit 9. The second portion in conduit 9 is introduced to isostripper 10 where the alkylate product is separated and withdrawn in the bottoms from the isostripper via conduit 11. The overhead from the isostripper, comprising mostly catalyst and isoparaffin, is withdrawn via conduit 12 and split in partial condenser 14, into a first portion, which is combined with the hydrocarbons in conduit 8 by way of line 13, and a second portion which is conducted to settler 16 via conduit 15. In settler 16, free acid, i.e. hydrogen fluoride not dissolved in the isoparaffin, is separated from the hydrocarbons. The free acid is withdrawn from the settler through conduit 17. The hydrocarbon phase in settler 16 is withdrawn by conduit 18 and charged to depropanizer 19, where any remaining acid and any light gases such as propane are separated from the isoparaffin. The isoparaffin is withdrawn in the bottoms from the depropanizer by conduit 20 and charged to the reactor as described above. The overhead from the depropanizer, comprising mostly acid and light hydrocarbons, is withdrawn by conduit 21 and introduced to settler 22, where it is separated into an acid phase and a hydrocarbon phase. The hydrocarbon phase, containing dissolved acid, is charged to HF stripper 26 by conduit 24. A portion of the mixture in conduit 24 is separated and reintroduced into depropanizer 19. In HF stripper 26, propane and other hydrocarbons are separated and withdrawn in the bottoms via conduit 28. A mixture of acid and hydrocarbons is returned overhead via conduit 27 to conduit 21. Settled acid is withdrawn from settler 22 via conduit 23 and combined with acid in conduit 17. The hydrocarbons in conduit 8 are charged to the refrigeration unit 29, where the temperature of the stream is reduced to a temperature about 25° F.–150° F. below that in reactor 3, and the stream is subsequently charged via conduit 8 to settler 30, where an acid phase and a hydrocarbon phase form. The hydrocarbon phase is withdrawn from settler 30 and combined with the fresh feed to the process through conduit 32 as described above. The acid phase is withdrawn via conduit 31. The hydrogen fluoride from settlers 16 and 22 is charged via conduits 23 and 17 to conduit 31, through which the high purity acid is introduced into settler 5. A slip stream of acid is withdrawn through conduit 33 from the catalyst recycle stream in conduit 7, and charged to the acid regenerator 34. In the acid regenerator, the catalyst is separated from contaminants such as polymerized hydrocarbons or tars. The waste material, e.g. tars and constant boiling catalyst-water mixture, is withdrawn from the process by conduit 35, while the high purity acid is conducted via conduit 36 to conduit 31.

DETAILED DESCRIPTION OF THE INVENTION

Alkylatable reactants suitable for use within the scope of this invention are those which have been utilized in prior art processes for producing an alkylate product. Examples of such compounds include the isoparaffins such as isobutane, isopentane, and isohexane. Isobutane is preferred.

Olefinic reactants suitable for alkylating the above-described alkylatable reactants include mono-olefins, polyolefins, and alkyhalides. The preferred olefinic reactants are the $C_3$–$C_8$ mono-olefins, and mixtures thereof. The $C_3$–$C_8$ preferred olefins may be suitably utilized as they are found in petroleum refinery streams and may be utilized where diluted with gases such as hydrogen, nitrogen, methane, ethane, propane, butane, etc. The butylenes are preferred, and in particular, 2-butene.

The hydrogen fluoride catalyst suitable for use in the present invention is well known to the prior art. Normally, this catalyst comprises essentially anhydrous hydrogen fluoride, i.e. having less than 5% water content by weight. The concentration of hydrogen fluoride in the catalyst is normally higher than about 70% by weight. Alkylation conditions are chosen to minimize side reactions, such as olefin polymerization, cracking, halogen substitution, etc., to maximize the formation of desired alkylate products, and to maintain the reaction mixture of hydrocarbons and catalyst as a liquid phase. Generally, alkylation conditions include a temperature of from about 0° F. to about 200° F. For an isoparaffin-olefin alkylation process, the temperature range is typically from about 50° F. to about 150° F. The pressure of the alkylation zone should be such as to maintain the reaction mixture as a liquid phase, and is generally in the range from about 1 atmosphere to about 50 atmospheres. The contact time for the reaction mixture, defined as the ratio of catalyst volume within the reaction zone to volume rate per minute of reactants charged to the reaction zone, will usually be less than 15 minutes, and preferably less than 10 minutes. The catalyst should be present in the reaction mixture in an amount sufficient to provide a catalyst/reactants volume ratio in the range from about 0.5 to about 10. The alkylatable reactant/olefin-acting reactant mole ratio in the alkylation reaction mixture is maintained at a level within the range from about 1 to about 30 and preferably within the range from about 8 to about 20.

Any sort of alkylation zone known to prior art may suitably be employed to admix and contain the alkylation reaction mixture in the practice of this improved process. A particular embodiment of the process may employ a batch reaction scheme, a plug-flow reaction scheme, or a continuously stirred reaction scheme to admix, react and contain the reactants, catalyst and reaction products. Various means are well known for admixing the reactants with the catalyst to form the reaction mixture or to admix reactants or catalyst with a reaction mixture containing catalyst, reactants, alkylate product, or a combination thereof. Any of these means for admixing may be employed in the present process.

This invention is the result, in part, of my discovery that, by controlling the alkylation reaction rate in portions of the reactants in an alkylation process when they are initially introduced into an alkylation zone an alkylate product of higher quality can be produced. For instance, the yield of high octane, highly branched hydrocarbons is increased and the yield of low octane and polymerized products is reduced by the practice of the present invention. The initial rate of reaction is slowed by decreasing the temperature of the reactants when they initially encounter the catalyst upon entering the alkylation zone. The temperature of the catalyst and the alkylation zone are maintained at a higher level desirable with respect to the reaction rate of the partially reacted mixture. The freshly introduced reactants are relatively olefin reactant-rich, and when such olefin reactant-rich portions are initially admixed with the reaction mixture, the temperature of the reaction mixture is higher than would result in a satisfactory initial reaction rate in those olefin-rich, freshly introduced portions. The overly high initial reaction rate in these olefin reactan-rich, freshly introduced portions has resulted in high yields of undesirable products from side reactions of the olefins in prior art processes. The temperature of a portion of a feed stream when the portion initially enters the reaction zone and before the portion has come to thermal equilibrium with the alkylation conditions in the zone is to be distinguished from the temperature of alkylation conditions in the bulk of the reaction mixture. In prior art alkylation processes, the temperature of initially introduced olefin reactant-rich portions of the reactants is rapidly increased above the optimum reaction temperature of alkylation conditions, and a large yield of undesirable products formed, before the freshly introduced portions have come to thermal equilibrium.

When olefin reactant-rich feed is introduced to an alkylation zone in prior art processes, the instantaneous rate of reaction in the freshly introduced portion, when exposed to the hydrogen fluoride catalyst, is extremely high, both because of the high concentration of olefinic reactant and the lack of sufficient time for the temperature of the freshly introduced portions to come to thermal equilibrium with the reaction mixture. Within a short time after introduction, olefin reactant-rich feed is disbursed in the reaction mixture and comes to thermal equilibrium with the mixture, but only after undergoing an initial period of reaction with an undesirably high reaction rate and temperature rise. During this initial period, large amounts of undesirable products are formed, since the high reaction rates, temperatures and high local reactant concentrations favor the production of polymers and less branched, low octane alkylate. This initial, detrimental phenomenon is at least partially independent of the temperature prevailing in the reaction mixture as a whole. The heat generated by the high initial reaction rate increases the reaction rate causing a chain-reaction increase in both temperature and reaction rate so rapidly that heat transfer into the heat sink provided by the catalyst and hydrocarbons in the alkylation zone is inadequate to carry off enough heat energy to prevent the detrimental initial conditions. Through the practice of my invention, the production of the initially produced undesirable product can be substantially reduced. When the olefin reactant-rich feed, for example, is introduced at a temperature below that of the reaction mixture, two things in particular act to control the initial temperature rise and reaction rate, and, consequently, to facilitate regulaion of alkylation conditions to provide optimum alkylate product. First, the initial reaction rate is slowed down because the temperature of the localized, concentrated portions of freshly introduced feed is low and the reaction rate, being temperature dependent, is slow. Second, the freshly introduced portions of reactants act as heat sinks, absorbing the heat produced without developing an undesirably high initial temperature.

Another advantage of the present process lies in diluting the olefinic feed with isoparaffinic reactant which is substantially free from hydrogen fluoride. When the olefinic reactant is introduced to the alkylation zone greatly diluted by isoparaffin, the olefin reacts more selectively with the isoparaffin to produce the desired product, rather than polymer and low octane alkylate. The effect of this dilution, when combined with the effect of refrigeration of the hydrocarbons enables the alkylation zone conditions to be held at a higher temperature, permitting greater solubility of isoparaffin in the hydrogen fluoride phase. This, in turn, also promotes the selective reaction between olefin and isoparaffin to create the desired alkylate product.

The alkylation conditions which are favorable to the production of desirable products also favor the formation of alkyl fluorides. Alkyl fluoride compounds are thought to be intermediates in the reaction between olefin and isoparaffin. They are of little value, and difficult to separate from more valuable components. The most desirable method for disposing of these intermediates is to further react them to form additional alkylate product. I have found that these alkyl fluorides can be reacted further by contacting them with high purity hydrogen fluoride. In prior art processes, there has been a choice of alkylation conditions between those which favor production of desirable alkylate and those which favor low alkyl fluoride production. Through the process of this invention it has become possible to utilize optimum conditions both for the creation of alkylate product and for the minimization of alkyl fluoride. In the alkylation zone, optimum conditions are maintained to provide a maximum yield of the desired high alkylate product which conditions also favor a high yield of alkyl fluorides. In the separation zone, to which the effluent from the alkylation zone is introduced, conditions are maintained to favor the reaction of the alkyl fluorides to provide additional alkylate product. Hight purity hydrogen fluoride is obtained by refrigerating a portion of the effluent from the first separation zone and settling out substantially pure acid. This procedure also provides acid free isoparaffin for use in dilution of the olefinic reactant. The defluorination stream of high purity hydrogen fluoride may also be provided by, or augmented by acid from other readily available sources, such as the acid regenerator and settlers for the feed and overhead on the depropanizer. However, the acid obtained by refrigerating and settling recycled effluent from the first separation zone is preferred. The heat sink effect of this stream of acid, combined with its high strength, are ideal for catalyzing the reaction of alkyl fluorides to produce alkylate. This refrigerated stream also provides an advantageous means for controlling and facilitating the rapid settling of phases which is desirable when processing large quantities of reactants and catalyst.

Separation conditions in the separation zone in which the alkylation zone effluent and the high purity hydrogen fluoride are introduced and contacted are similar to the conditions in the alkylation zone. These conditions will include a temperature in the range from about 0° F. to about 200° F. and a pressure in the range from about one atmosphere to about 20 atmospheres. It is preferred, but not essential, that means be provided for intimately admixing the alkylation zone effluent with the high purity acid. For example a vessel containing a space with trays for mixing and a space for settling of hydrocarbon and acid phases would be suitable. Mixer-settlers and settlers known to prior art may be suitably used in an embodiment.

Means for settling phases, splitting portions of streams, and fractionating streams to recover desired products are well known. It is contemplated that these may be utilized to perform the various indicated separations and fractionations in the present process. It will also be obvious to those skilled in the art that certain other ancillary equipment, e.g. pumps, pipes, motors, etc. will be required in a particular embodiment of this process. The scope of the process of the present invention includes all such obvious ancillary means and equipment.

The recycle stream to be refrigerated is provided by a portion of the effluent from the first separation zone, which is split to provide this portion and a second portion from which the product is recovered. It is contemplated that these recycle and product streams will comprise portions of the same hydrocarbon phase and have substantially the same composition. These streams will both have large fractions of the isoparaffin, normaly isobutane, in addition to the heavier alkylate product. In prior art alkylation processes, the hydrocarbon stream obtained from a settler is typically fractionated as a whole, and the isoparaffin, olefin, if any, and dissolved and entrained hydrogen fluoride are recycled to the alkylation zone. This recycle stream may be termed the isostripper recycle stream. In the present process, this stream is further processed before recycling it to the alkylation zone in contrast to processes known in prior art. The remaining portion of the hydrocarbon stream, the recycle stream, is not processed in the same manner as the fractionation stream.

The alkylation reaction being exothermic, means are required for maintaining the proper temperature in the alkylation zone, as discussed above. One function of cooling the refrigeration stream is to provide sufficient cooling for the alkylation zone. The refrigeration stream is formed from the effluent recycle stream, the isostripper recycle stream, or a portion of one or both of these streams, the size of the refrigeration stream depending upon the cooling requirements of the alkylation zone, and the amount of relatively pure catalyst needed to fully defluorinate the alkylation zone effluent in the first separation zone. The refrigeration stream is cooled to a temperature of from about 25° F. to about 150° F. below the temperature of the alkylation zone, and charged to a second settling zone, where it is separated into two phases, the first comprising essentially acid-free hydrocarbons and the second comprising essentially pure hydrogen fluoride. Several advantages are gained from separating the hydrocarbons from the acid in this manner and particularly by performing the refrigeration on this stream. First, the cooling requirements for the alkylation zone can be satisfied by utilizing the acid-free hydrocarbon phase, as the refrigerated hydrocarbons stream, to act as a heat sink in the alkylation zone. Second, by combining this refrigerated hydrocarbon stream with the fresh, olefin-rich feed in the reactants stream, the initial reaction rate of the feed in the alkylation zone may be advantageously controlled as discussed above. Third, the acid-free stream may be combined with the reactants stream of olefin and make-up isoparaffin without the unwanted presence in the recycle stream of free entrained hydrogen fluoride. In order to create proper conditions for alkylation, the fresh olefin-rich reactants stream must be diluted preferably with isoparaffin reactant, before it is charged to the alkylation zone. When the isoparaffin recycle contains free entrained hydrogen fluoride, the free acid causes undesirable side reactions to take place in the feed stream formed by the fresh reactants and recycle. By introducing the recycle free from acid, the benefits of dilution of the fresh reactants may be gained without incurring the disadvantage of having free acid present.

The separation zone employed to separate the refrigeration stream into the defluorination stream of substantially pure hydrogen fluoride and the refrigerated hydrocarbons stream may be any vessel which can contain the hydrocarbon and catalyst phases at refrigerated settling conditions. These conditions include a temperature of from about 0° F. to about 75° F. and a pressure of from about 1 atmosphere to about 20 atmospheres. In a preferred embodiment, refrigerated settling conditions will include a temperature in the range from about 0° F. to about 60° F. and a pressure in the range from about 10 atmosphere to about 15 atmospheres.

The process of this invention provides a method for producing a high quality alkylate product which is superior to the processes known to prior art. The products stream which is separated from the fractionation recycle stream may be treated in any suitable manner to recover an alkylate product having a high ratio of trimethylpentanes to dimethylhexanes and having excellent antiknock properties as a motor fuel component.

I claim as my invention:

1. An alkylation process which comprises reacting an alkylatable hydocarbon with an olefinic hydrocarbon in contact with hydrogen fluoride catalyst at an alkylating temperature of from about 0° F. to about 200° F. in an alkylation zone, introducing the alkylation zone effluent into a first settling zone and therein commingling the same with a substantially pure hydrogen fluoride stream, as hereinafter delineated, the alkylate alkyl fluorides present in said effluent separating the mixture in said first settling zone into a first hydrocarbon phase and a catalyst phase, returning a portion of said catalyst phase to the alkylation zone, regenerating another portion of said catalyst phase, removing the hydrocarbon phase from the settling zone and reducing the temperature of a first portion thereof to a level from about 25° F. to abount 150° F. below said alkylating temperature in said alkylation zone, separating from a second portion of said hydrocarbon phase an overhead fraction and an alkylate product, separating hydrogen fluoride from a portion of said overhead fraction, introducing the cooled first portion of the hydrocarbon phase to a second settling zone and therein separating a second hydrocarbon phase from a catalyst phase, supplying to said catalyst phase from said second settling zone, said hydrogen fluoride from said regenerating step and said hydrogen fluoride separated from said overhead fraction as said substantially pure hydrogen fluoride stream to said first settling zone, and supplying said first hydrocarbon phase to said alkylation zone.

2. The process of claim 1 further characterized in that said alkylatable hydrocarbon is isobutane.

3. The process of claim 1 further characterized in that said olefinic hydrocarbon is propylene.

4. The process of claim 1 further characterized in that said olefinic hydrocarbon is introduced into said alkylation zone at a temperature from about 25° F. to about 150° F. below the temperature in said alkylation zone.

5. The process of claim 1 further characterized in that said alkylatable hydrocarbon and said olefinic hydrocarbon are introduced into said alkylation zone at a temperature about 25° F. to about 150° F. below the temperature of said alkylation zone.

References Cited
UNITED STATES PATENTS

| | | | |
|---|---|---|---|
| 3,478,125 | 11/1969 | Chapman | 260—683.48 |
| 3,204,011 | 8/1965 | Hettick et al. | 260—683.48 |
| 3,158,661 | 11/1964 | Plaster et al. | 260—683.48 |
| 3,073,877 | 1/1963 | Sherk | 260—683.48 |
| 3,073,878 | 1/1963 | Johnson | 260—683.48 |

DELBERT E. GANTZ, Primary Examiner

G. J. CRASANAKIS, Assistant Examiner

U.S. Cl. X.R.

260—683.42

UNITED STATES PATENT OFFICE
CERTIFICATE OF CORRECTION

Patent No. 3,755,492　　　　　　　　Dated August 28, 1973

Inventor(s) Robert F. Anderson

It is certified that error appears in the above-identified patent and that said Letters Patent are hereby corrected as shown below:

Column 10, line 33, change "first" to -- second --.

Column 10, line 13, change "the" to -- to --.

Signed and sealed this 10th day of December 1974.

(SEAL)
Attest:

McCOY M. GIBSON JR.　　　　　　　C. MARSHALL DANN
Attesting Officer　　　　　　　　Commissioner of Patents